(12) United States Patent
Martini

(10) Patent No.: US 9,104,895 B2
(45) Date of Patent: Aug. 11, 2015

(54) METHOD FOR ACCESSING A PORTABLE DATA STORAGE MEDIUM WITH AUXILIARY MODULE AND PORTABLE DATA STORAGE MEDIUM

(75) Inventor: Ullrich Martini, Munich (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 490 days.

(21) Appl. No.: 13/318,969

(22) PCT Filed: May 5, 2010

(86) PCT No.: PCT/EP2010/056058
§ 371 (c)(1),
(2), (4) Date: Nov. 4, 2011

(87) PCT Pub. No.: WO2010/128059
PCT Pub. Date: Nov. 11, 2010

(65) Prior Publication Data
US 2012/0110292 A1    May 3, 2012

(30) Foreign Application Priority Data
May 5, 2009  (DE) .......................... 10 2009 019 982

(51) Int. Cl.
*G06F 12/00* (2006.01)
*G06F 13/00* (2006.01)
(Continued)

(52) U.S. Cl.
CPC ................ *G06F 21/79* (2013.01); *G06F 21/78* (2013.01)

(58) Field of Classification Search
CPC .. G06F 12/14; G06F 2221/2121; G06K 19/00
USPC ........................................................ 711/163

See application file for complete search history.

(56) References Cited

U.S. PATENT DOCUMENTS 6,525,557 B1 *  2/2003  McManus et al. ................ 326/8
7,065,621 B2 *  6/2006  Hidai et al. ..................... 711/163
(Continued)

FOREIGN PATENT DOCUMENTS

DE  102007050463        5/2008
DE  102007050463 A1 *  5/2008

OTHER PUBLICATIONS

Universal Serial Bus Device Class: Smart Card CCID Specification for Integrated Circuit(s) Cards Interface Devices, Revision 1.1, Apr. 22, 2005, 5 pages.*

(Continued)

*Primary Examiner* — Tuan Thai
*Assistant Examiner* — Daniel C Chappell
(74) *Attorney, Agent, or Firm* — Workman Nydegger

(57) ABSTRACT

The invention describes a method for accessing a portable storage data carrier (10) having a controller (12) for managing a standardized storage element (14) and having an additional module (16), wherein a data block is transferred to the storage data carrier (10) in a first transmission protocol. The data block comprises routing information and application data, whereby the routing information contains an identifier which can be detected by the controller (12). Furthermore, it is determined whether a data block received on the storage data carrier (10) contains routing information. The data block is relayed to a storage area (18) of the storage element (14), said storage area being hidden to a terminal (50), when the data block comprises routing information and the routing information comprises, besides the identifier contained therein, at least one further, predetermined parameter indicating the access to the hidden storage area (18).

24 Claims, 4 Drawing Sheets

(51) Int. Cl.
*G06F 13/28* (2006.01)
*G06F 21/79* (2013.01)
*G06F 21/78* (2013.01)

(56) References Cited

U.S. PATENT DOCUMENTS

| | | | |
|---|---|---|---|
| 7,334,077 B2* | 2/2008 | Nassar | 711/100 |
| 7,370,166 B1* | 5/2008 | Ramesh et al. | 711/163 |
| 7,743,409 B2* | 6/2010 | Gonzalez et al. | 726/9 |
| 7,861,311 B2* | 12/2010 | Seo et al. | 726/27 |
| 7,900,012 B2* | 3/2011 | Chang et al. | 711/170 |
| 8,200,930 B2* | 6/2012 | Hull et al. | 711/163 |
| 8,296,580 B2* | 10/2012 | Adams et al. | 713/189 |
| 8,307,131 B2* | 11/2012 | Prevost et al. | 710/10 |
| 8,307,181 B2* | 11/2012 | Chou et al. | 711/164 |
| 8,423,794 B2* | 4/2013 | Holtzman et al. | 713/193 |
| 8,479,011 B2* | 7/2013 | Ali et al. | 713/185 |
| 8,539,245 B2* | 9/2013 | Swanson et al. | 713/182 |
| 8,683,159 B2* | 3/2014 | Dunstan | 711/163 |
| 8,868,929 B2* | 10/2014 | Robles et al. | 713/193 |
| 2005/0086421 A1* | 4/2005 | Nassar | 711/103 |
| 2005/0257017 A1* | 11/2005 | Yagi | 711/163 |
| 2009/0125643 A1* | 5/2009 | Prevost et al. | 710/10 |
| 2009/0125645 A1* | 5/2009 | Prevost et al. | 710/13 |
| 2010/0023650 A1* | 1/2010 | Prevost et al. | 710/16 |
| 2010/0023777 A1* | 1/2010 | Prevost et al. | 713/180 |
| 2013/0013933 A1* | 1/2013 | Adams et al. | 713/189 |

OTHER PUBLICATIONS

Definition of "directly", Merriam-Webster Dictionary, retrieved from http://www.merriam-webster.com/dictionary/directly on Jul. 6, 2013 (3 pages).*
International Search Report in PCT/EP2010/056058, Jul. 8, 2010.

* cited by examiner

METHOD FOR ACCESSING A PORTABLE DATA STORAGE MEDIUM WITH AUXILIARY MODULE AND PORTABLE DATA STORAGE MEDIUM

FIELD OF INVENTION

This invention relates to a method for accessing a portable storage data carrier and a controller for managing a standardized storage element and having an additional module. The invention relates further to a portable storage data carrier and to a terminal. In particular, the invention relates to a mass storage card having a smart card IC.

BACKGROUND

Portable mass storage devices with ever increasing storage capacity are being employed more and more frequently in a great variety of electronic devices. There can be stored thereon digital contents or text, image, audio or video data or the like. Portable mass storage devices have the advantage here that they can be read and optionally written by different electronic devices, such as PCs, PDAs, smartphones, digital cameras, audio devices, etc. The portable mass storage devices thus permit a simple saving and transporting of digital contents.

For portable mass storage devices there have been developed different standards whose degree of acceptance varies. Widespread types of mass storage devices are MultiMediaCards (MMC), Secure Digital memory cards (SD cards), microSD cards, memory sticks (USB sticks), but also CDs, DVDs, etc.

It is also known to additionally equip portable data carriers of the above-mentioned type with additional information, in particular security functions, in order for example to protect digital contents of the memory from unauthorized access. In this connection there is known from the applicant's WO 2008/058741 A2 a control system for accesses to a portable storage data carrier which has not only a secure smart card chip but also a conventional mass storage, in particular a flash memory, which is not specially protected. Through the interaction of routing information with a controller arranged on the card and set up to evaluate the routing information there is created a mechanism that allows the controller to route data incoming on the portable storage data carrier either to the flash memory or to the smart card chip. The routing information comprises an identifier unique to the smart card chip and preferably present in the form of a character string of predetermined length. The routing information can furthermore contain further information about sender and destination unit of application data. The accesses to the storage element are effected by means of standard commands of the employed operating system, in particular employing common write and read commands, search commands, identification commands, etc. In so doing there can be effected a return transmission of responses of the additional module to the terminal using a temporary working address in the storage element under which the response is made available in the storage data carrier. Through the control system described in this print it is possible to selectively address the main or additional function of the portable storage data carrier without any special drivers having to be respectively developed and set up.

In connection with the access to intelligent memory cards of all kinds, in particular SD cards, MMC cards, which additionally include a smart card chip, it is known from U.S. Pat. No. 7,334,077 B2 to establish a detection mechanism on the memory cards which interacts with a flag sequence which is inserted into conventional access commands. This permits the establishment of new commands and special operations on the storage data carrier without having to perform extensive changes on the drivers. The flag sequence here can be any string of data and is e.g. set in the data field of standard, write and read commands. The flag sequence can furthermore contain an indicator for the execution of a special operation. When the detection mechanism detects such a flag sequence in an access command, it does not execute the access command, but performs the command execution according to a mode of operation deposited on the memory card and executes in particular a special operation.

From WO 2007/076214 A2 there is further known a communication method between a terminal (host) and a data carrier via a reader/adapter when the terminal and the data carrier utilize different transmission protocols. In said communication method, commands are formed according to the local protocol of the card directly in the terminal and embedded in a data field of commands typical of the terminal. In the data carrier the embedded commands are extracted and executed. To signal the presence of embedded commands to the card, they are prefixed with a signature.

SUMMARY

It is hence the object of the present invention to state a method for communication between a terminal and a portable data carrier having a main function and at least one additional function, that allows the main function or the additional function of the portable data carrier to be selectively addressed without any special drivers having to be respectively developed and set up. In so doing it should be possible to perform accesses to the storage element of the storage data carrier without the terminal noticing the accesses or a trace of the access being left in the terminal. It is further the object of the invention to state a portable storage data carrier suitable for carrying out the method, and a corresponding terminal.

The invention provides a method for accessing a portable storage data carrier having a controller for managing a standardized storage element and having an additional module. In the method, a data block is transferred to the storage data carrier in a first transmission protocol, whereby the data block comprises routing information and application data, and whereby the routing information contains an identifier which can be detected by the controller. It is further determined whether a data block received on the storage data carrier contains routing information. According to the invention, the data block is relayed to a storage area of the storage element, said storage area being hidden to a terminal, when the data block comprises routing information and the routing information comprises, besides the identifier contained therein, at least one further, predetermined parameter indicating the access to the hidden storage area.

The invention thus provides a possibility to write the storage element with data whereby it is defined by a context whether or not writing is permitted. This makes it possible to write in areas of the storage element where it would usually not be permitted. This area of the storage element is designated the hidden storage area. It results that a part of the storage element is write protected. This corresponds to the emulation of a CD-ROM. Through the sending of the routing information having the further, predetermined parameter it is possible to get around this write protection temporarily and in controlled fashion to incorporate new data into said hidden storage area (CD-ROM emulation).

An advantage of the method of the invention is that an access to the data of the storage element in the storage data carrier can be performed without the terminal noticing the accesses or a trace of the access being left in the terminal. This provides an elevated measure of security. The data contained in the hidden storage area are visible only when the data can be correctly interpreted. This makes it possible to avoid error messages due to a missing access right.

In particular, it is provided that there is executed on the terminal a privileged application which can access the hidden storage area. It is particularly preferable in this connection when only the privileged application can access the hidden storage area. In particular, it should not be possible for the operating system of the terminal to access the hidden storage area. This makes it possible to further improve security upon an access to the portable storage data carrier.

An access of the privileged application to the hidden storage area is expediently effected without administrative rights for the portable storage data carrier, thereby making it possible to avoid error messages due to missing rights of the operating system.

The storage element of the portable storage data carrier has an actual total size, there being transferred as the total size from the portable storage data carrier to the terminal a value representing the size of the storage element that results from the difference between the actual total size and the size of the hidden storage area. This "hushes up" the existence of the hidden storage area without the presence of a special context.

According to a further embodiment, the terminal is provided with a programming interface which, upon a request of the privileged application to the hidden storage area, converts the request to a data block and adds the further, predetermined parameter to the routing information.

In reaction thereto, upon an access to the hidden storage area its file directory (also referred to as the storage directory) and optimally the data contained therein are transferred to the terminal in a response. More precisely, this information is transferred to the privileged application.

To further increase the security of the access to data deposited in the hidden storage, it can further be provided that the data stored in the hidden storage area are stored in encrypted form.

It can further be provided that the first transmission protocol is coordinated with the storage element. Alternatively, it can be provided that commands that cannot be transferred thereto in a second transmission protocol of the storage element are transferred to the portable storage data carrier in a data block in the first transmission protocol with the routing information. This configuration variant permits commands that cannot be transferred to the controller of the storage data carrier in the transmission protocol of the storage element to be "packed" in a data block that is interpretable by the controller, in order to thereby tunnel the command in the second transmission protocol within the first transmission protocol.

In particular, for this purpose the routing information is supplemented by a second, predetermined parameter for indicating the command in the second transmission protocol. Therefore, commands of the second transmission protocol can be transferred from the terminal to the controller of the storage data carrier without additional hardware, drivers or administrative rights, detected by the controller as a command in a second transmission protocol and extracted. The command can then be made available to the storage element by the controller.

The invention further provides a portable storage data carrier having a controller for managing a standardized storage element and having an additional module. The storage data carrier is configured for receiving a data block from a terminal in a first transmission protocol, whereby the data block comprises routing information and application data, and whereby the routing information contains an identifier which is detectable by the controller. The storage data carrier is further configured for determining whether a data block received on the storage data carrier contains routing information. According to the invention, the storage data carrier is configured for relaying the data block to a storage area of the storage area, said storage area being hidden to a terminal, when the data block comprises routing information and the routing information comprises, besides the identifier contained therein, at least one further, predetermined parameter which indicates the access to the hidden storage area.

Finally, the invention provides a terminal which is configured for the access via a standard interface to a portable storage data carrier of the above-mentioned type. The terminal is adapted to generate, for application data intended for the additional module, routing information having a further, predetermined parameter indicating the access to the hidden storage area.

The portable storage data carrier of the invention and the terminal of the invention have the same advantages as were described hereinabove in connection with the method of the invention.

Finally, the invention provides a system comprising a portable storage data carrier of the described type, and a terminal of the above-described type.

The invention further comprises a computer program product for the access to a storage data carrier having an additional module, which can be loaded directly into a storage system of a terminal and comprises software code portions with which the method steps of the above-described method are executed when the computer program product is executed on a processor of the terminal.

BRIEF DESCRIPTION OF THE DRAWINGS

The invention will hereinafter be explained more closely with reference to embodiment examples. There are shown.

DETAILED DESCRIPTION OF VARIOUS EMBODIMENTS OF THE DISCLOSURE

Figure 1:
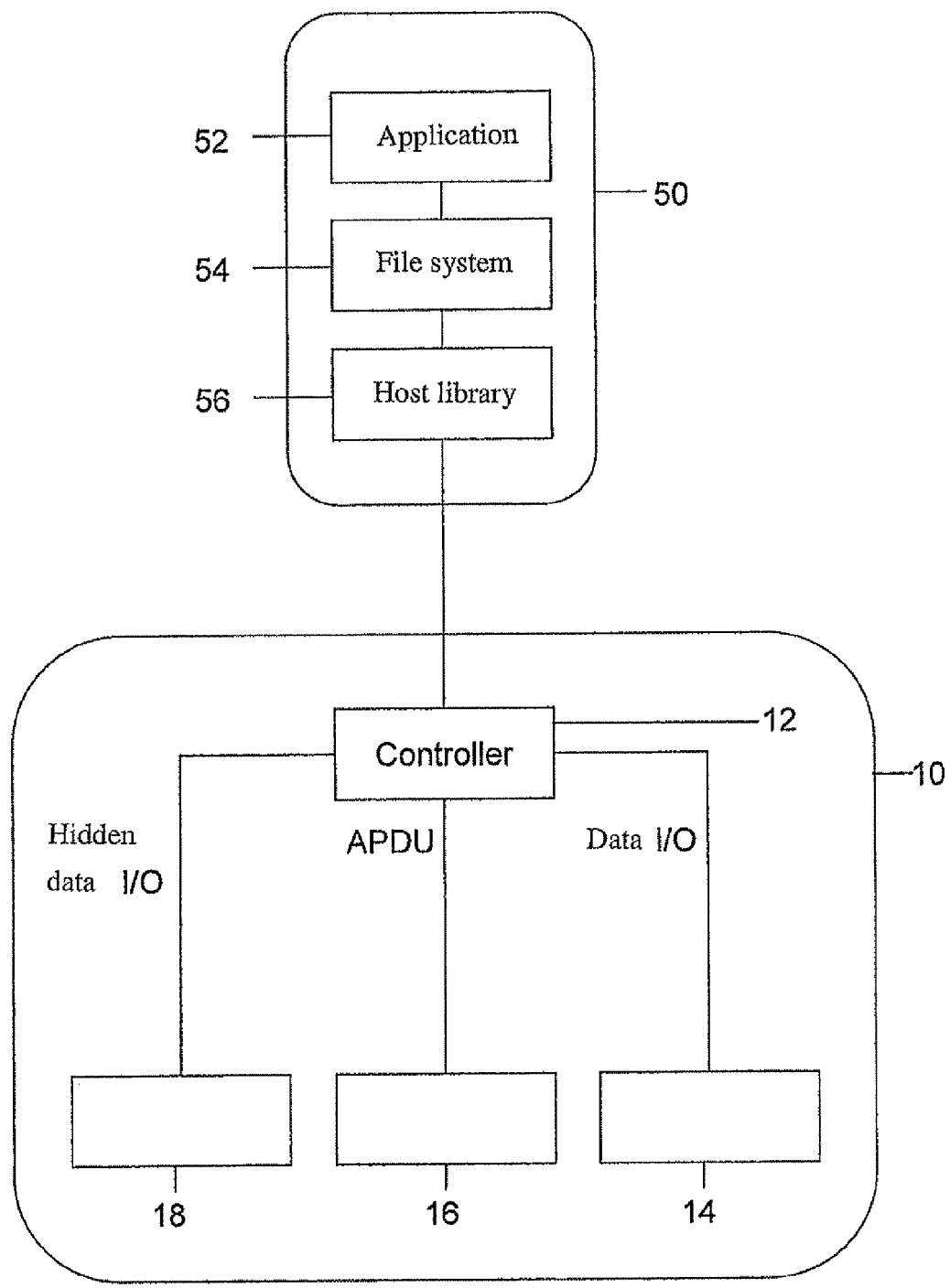
FIG. 1 a schematic representation of a system of the invention which comprises a terminal and a portable storage data carrier, FIG. 2 a schematic representation of an implementation of the method of the invention in a first configuration variant, FIG. 3 a schematic representation of an implementation of the method of the invention in a second configuration variant, and FIG. 4 a schematic representation of an implementation of the method of the invention in a further configuration variant.

FIG. 1 shows a system consisting of a terminal 50 and a portable storage data carrier 10 with their respective essential components. The system of the invention is based on the system described in WO 2008/058741 A2, whose content is incorporated in this application by reference.

A "terminal" will hereinafter be understood to be a computer-based device that makes software and hardware resources available to a user in order to execute different data processing tasks determined by one or several applications 52. Terminals can be electronic devices or end devices of any kind that have an interface for storage data carriers (not depicted), such as for example a personal computer (PC), a host for a plurality of users or in particular also a mobile end device, e.g. a mobile phone or a PDA, a digital camera, a digital audio system or the like.

The terminal 50 is based on a conventional computer whose typical components are also not specifically depicted when they are not necessary for describing the invention. It possesses an operating system for executing all basic terminal functions, a file system 54 associated with the operating system, a driver for controlling a data exchange with an external device, an electromechanical interface for establishing a physical data exchange connection to an external device, and a terminal library 56 (so-called host library). The terminal serves to execute different applications 52 which are deposited in software form in a respective storage of the terminal 50.

A portable "storage data carrier" will hereinafter be understood basically to be a computer-based device which is housed in a portable, geometrically small housing so that it can be comfortably carried by a user, has no human-machine interface, or one of only reduced configuration, and which makes limited software and hardware resources, in accordance with its overall size, available to a user in order to be able to perform a limited set of data processing tasks. Typical construction forms for a portable storage data carrier are a smart card, a USB token, a MultiMediaCard (MMC), a Secure Digital memory card (SD card) or a memory stick.

The portable storage data carrier 10 has according to the invention one main function and one or several additional functions. The main function consists in the ability to manage a storage element 14 by employing a transmission protocol coordinated with the storage element 14. The main function defines the transmission protocol according to which the terminal 50 communicates with the portable storage data carrier 10. The implementation of the main function can be restricted to the device for executing the transmission protocol. The function proper, i.e. in particular a storage functionality, need not necessarily be actually implemented. The additional function can consist e.g. in a signature function or in an authentication function. It is made available by an additional module 16 which works independently of the main function. The additional module 16 can be realized here as a pure software component, as a hardware component or as a combination of the two.

Main components of the portable storage data carrier 10 are a controller 12 for controlling the storage function and the data exchange with the terminal 50, a storage system consisting of a rewritable storage element 14 for non-volatile recording of data, and a hidden storage area 18 for exclusive access by a privileged application running on the terminal 50. The hidden storage area 18 can be formed by a part of the storage element 14, whereby the size and content of the hidden storage area is on principle not observable and/or accessible to the terminal 50. Furthermore, the portable storage data carrier 10 has the additional module 16 for executing one or several additional functions, and a mating interface corresponding to the interface of the terminal 50 for establishing a physical connection for data exchange with the terminal 50.

The interface between the terminal 50 and the portable storage data carrier 10 is typically of the contact type, but can also be configured as a contactless-type interface. It can be for example a universal standard interface, e.g. a USB interface, or an interface coordinated with a certain type of storage apparatus 14, e.g. an interface for a MultiMediaCard (MMC), Secure Digital memory card (SD card) or memory stick. For carrying out a data exchange via the interface there is used a suitable transmission protocol coordinated with the storage element 14, which is normally clearly different from a specific protocol suitable for communication with the additional module 16.

The storage element 14 does not need to be an integral component of the storage data carrier 10, but can be configured as an element different therefrom. Thus, the storage data carrier 10 can for example constitute functionally a converter via which the storage element 14 can be brought into communicative exchange with the terminal 50. For example, the storage data carrier 10 can be a USB/SD or USB/MMC converter, etc., while the storage element 14 is a Secure Digital memory card (SD card) or a MultiMediaCard (MMC), etc. In this connection it must be taken into consideration that the hidden storage area 18, contrary to the schematic drawing, is realized physically not in the portable storage data carrier 10 but in the storage element 14.

The operating system of the terminal 50 is an operating system that is widespread for computer-based end devices. It executes one or several applications 52 which are stored in the terminal 50 in the form of software. The application or applications 52 realize useful functions which can comprise accesses to the storage element 14 of the storage data carrier 10. The application or applications 52 can furthermore provide accesses to the additional module 16. While being executed, the application or applications 52 utilize system or standard functions made available by the operating system, in order e.g. to access a file system and, therethrough, files in the storage data carrier 10.

For execution of a logical command for accessing the storage element 14 transferred from the operating system of the terminal 50, a driver is used. The latter converts transparent access commands to commands that are interpretable for the controller 12 of the storage data carrier 10. The commands include basically an address of the storage element 14 and a statement of whether the command is a write or a read command. The data associated with a command are transferred in data lines. The driver employed is typically a standard driver coordinated with the nature of the interface between terminal 50 and storage data carrier 10 and the type of the storage element 14. The driver is for example a conventional flash card driver when the storage element 14 is of the flash card type.

The controller 12 of the storage data carrier 10 converts the incoming access commands to corresponding accesses to the storage element 14. For preparing the access commands in the terminal 50, the controller transfers a storage allocation directory therefor, whereby said directory contains no information about the hidden storage area 18. The controller 12 furthermore acts as a read/write device toward the additional module 16 and communicates therewith via a specific protocol (APDU). By means of an evaluation unit preferably adapted as a program, it evaluates incoming data blocks as to whether they are intended for the additional module 16. If data blocks are intended for the additional module 16, the controller 12 relays the application data contained in the data blocks to the additional module 16 via a switch-over unit provided for this purpose. The controller 12 further controls the data exchange in the reverse direction and transfers response data of the additional module 16 back to the terminal 50 or first stores them until the terminal 50 requests the response data. Furthermore, it serves to temporarily store responses of the additional module 16. The controller 12 further monitors the data exchange to the terminal 50 and with the additional module 16 as to formal correctness and plausibility. For example, it checks whether write and read accesses to the additional module 16 are respectively executed completely.

The additional module 16 is typically executed in the manner of a chip-card IC, i.e. it is especially tamper-resistant logically and physically, limited in its resources, and typically executes a security-critical function sensitive to attacks, e.g.

the creation of a signature for sent data. Preferably, the additional module 16 is a separate unit and possesses an independent controller. It is also conceivable to execute the additional module 16 as a functionally independent component of the controller 12 or together therewith as a common component. Accesses to the additional module 16 are effected employing a specific protocol which is realized by the controller 12.

To be able to perform an access to data of the storage element 14 in the storage data carrier 10 without the terminal 50 noticing the accesses or a trace of the access being left in the terminal, the hidden storage area 18 of the storage element 14 is provided. The controller 12 gives no information to the terminal 50 about the presence of the hidden storage area 18, about the size of the hidden storage area 18 or about the data contained therein. The access to the hidden storage area 18 is effected only via a specific programming interface in the terminal 50. A privileged application 52 in the terminal 50 translates requests for data in the hidden storage area 18 into a data block, e.g. a block address, of the programming interface. Said block address is transferred to the controller 12.

In the terminal 50, programming interfaces (API, Application Programmable Interface) are provided and standardized for many modem operating systems. Such a programming interface can be configured similarly to the "stdio" interface known from the POSIX specification, which is employed predominantly in C. Likewise, it can be configured similarly to the "IOstream" interface, which is employed primarily in C++. Similar programming interfaces exist for Java or .NET, whereby an implementation for such environments is based on native programming interfaces as are specified above. Requests received through the programming interface are mapped onto a logical block address in the hidden storage area. There is created a corresponding input/output command (I/O command), which is e.g. a standardized I/O command, e.g. an SCSI command as is employed in USB mass storage media, or can be an SD command. The I/O command includes a header with information that it is intended for the storage element 14, and optionally additional protocol information. The useful data contains routing information when the command is intended for the hidden storage area 18. Preferably, the routing information is formed by the first part of the useful data by the latter having a certain content.

The transmission of the block address is effected in the first data protocol which is coordinated with the storage element 14 or the storage data carrier 10. For example, there can be employed for this purpose USB mass storage commands. The data blocks for reading and writing data in the hidden storage area 18 are provided with routing information which comprises, besides an identifier contained therein for the access to the additional module 16, at least one further, predetermined parameter indicating the access to the hidden storage area 18. A host library 56 of the terminal 50 that desires to access a file in the hidden storage area 18 creates for this purpose the above designated data block.

The controller 12 translates these commands into read or write commands for the hidden storage area 18 of the storage data carrier when the data block comprises the routing information and the routing information comprises, besides the identifier contained therein, at least the further parameter indicating the access to the hidden storage area 18.

This procedure will be illustrated again with reference to FIG. 1. The terminal 50 is connected for example via a USB connection to the storage data carrier 10. The storage data carrier 10 comprises the controller 12 which can distinguish on the basis of the routing information in the data block between commands for the additional module 16 (APDU), a normal write or read command for the generally accessible storage element 14 (data I/O), and a command for the hidden storage area 18 (hidden data I/O). Data according to "data. I/O" are relayed directly to the storage element 14 and written. APDU commands are relayed to the additional module 16. A command for hidden data (hidden data I/O) is relayed to the hidden and optionally encrypted storage area 18.

Figure 2:
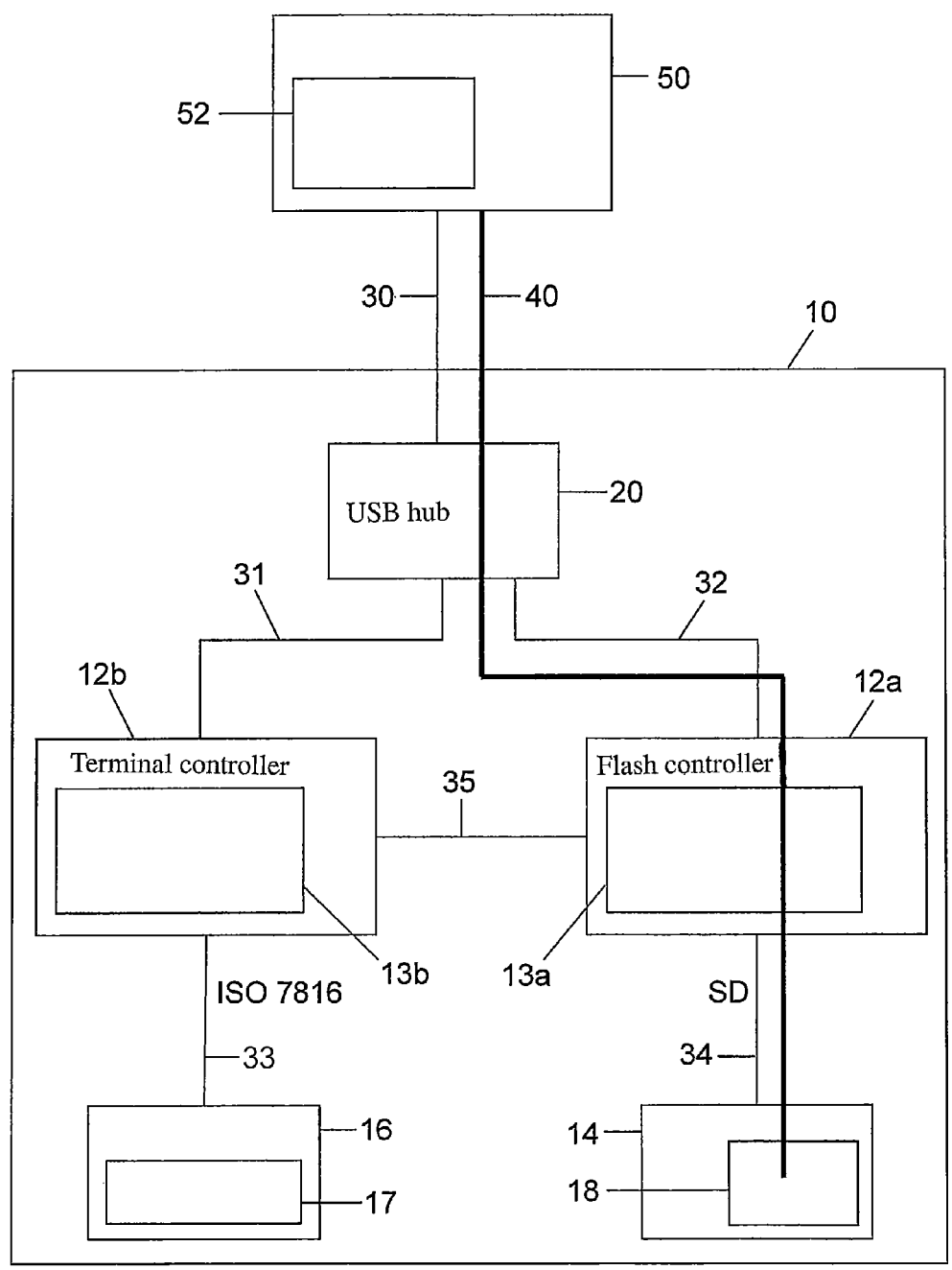
Figure 3:
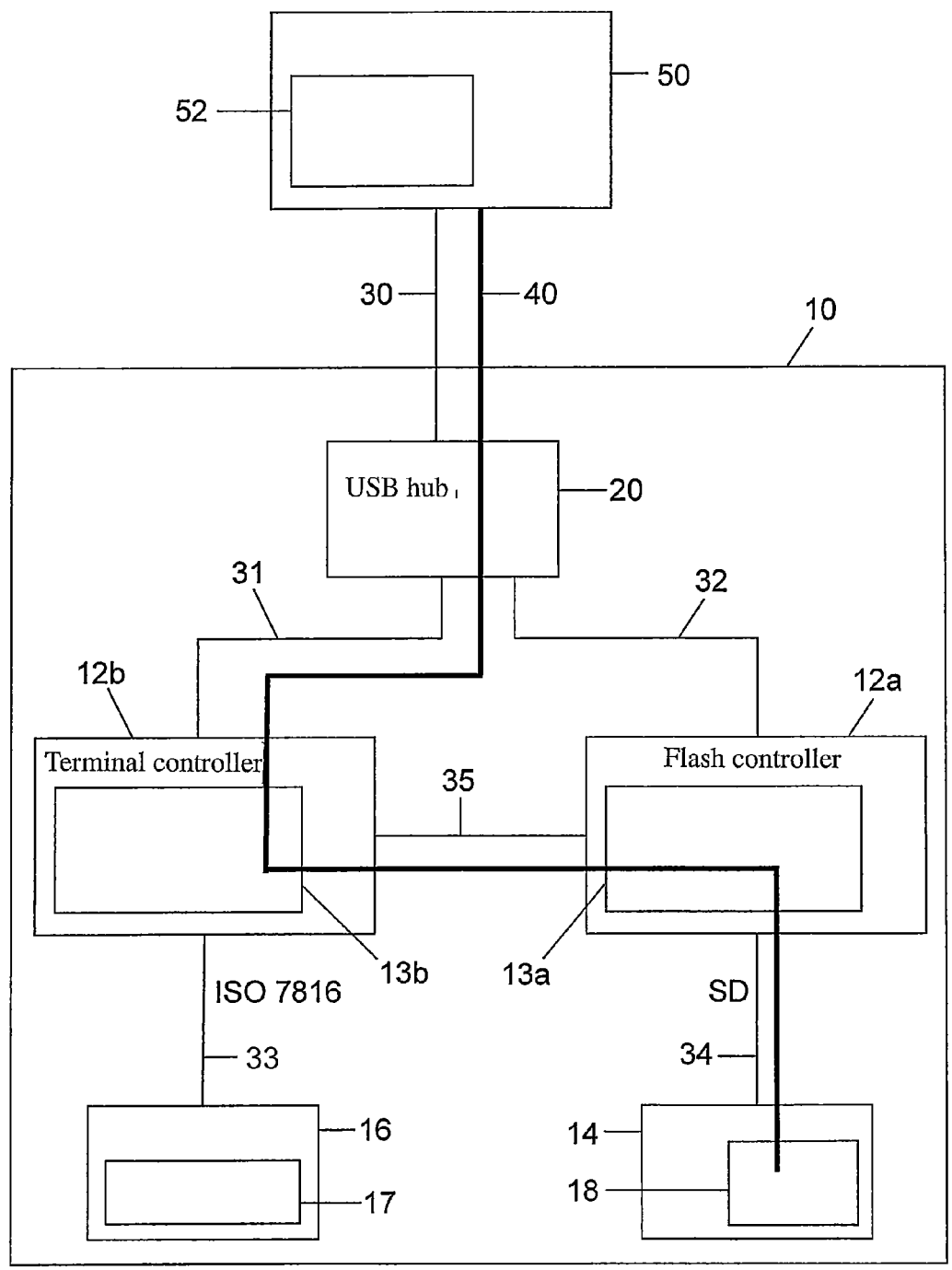

Two possible implementation variants of the method of the invention are depicted in FIGS. 2 and 3. Here, a distinction is made between a direct filtering of commands for the hidden storage area (FIG. 2) and a relayed filtering of commands for the hidden storage area (FIG. 3). The storage data carrier 10 comprises in these implementation examples a controller 12a (flash controller) and a controller 12b (terminal controller) which are connected respectively via a data connection 32, 31 to a USB hub 20. In the flash controller 12a an application 13a is realized. Accordingly, an application 13b is provided in the terminal controller 12b. The storage element 14 which comprises the hidden storage 18 is connected to the flash controller 12a via a communication link 34 according to the SD standard. The additional module 16 with an application 17 implemented therein is connected to the terminal controller 12b via a communication link 33 according to ISO 7816. The USB hub 20 is connected to the already described terminal 50 via a communication link 30.

In the implementation of a direct ascertainment and relaying of a command intended for the hidden storage area 18 as shown in FIG. 2, the terminal 50 transfers a command via the USB hub 20 directly to the flash controller 12a. The flash controller 12a performs the distinction between normal commands (data I/O) and commands for the hidden storage area (hidden data I/O) by employing the routing information having the further predetermined parameter indicating the access to the hidden storage area. In order not to worsen the performance of the access to the storage element 14, this procedure can be subjected to a limited use. An advantage of this variant is that the fast interface of the flash controller can be utilized. A realization is also possible avoiding the USB hub 20 by which the flash controller 12a is connected directly to a USB bus and thus directly to the terminal 50. The transmission path of a data block from the terminal 50 to the flash controller 12a identifying the routing information is marked by the reference sign 40.

In the configuration variant according to FIG. 3, a command intended for the hidden storage area 18 is transferred to the terminal controller 12b. The terminal controller 12b performs the distinction between an access to the storage element 14 or the hidden storage area 18 on the basis of the routing information contained in the data block and the further, predetermined parameter indicating the access to the hidden storage area. An advantage of this variant is that the command "Set Data Path" was already specified. Further, it is possible to employ keys of the additional module 16.

Figure 4:
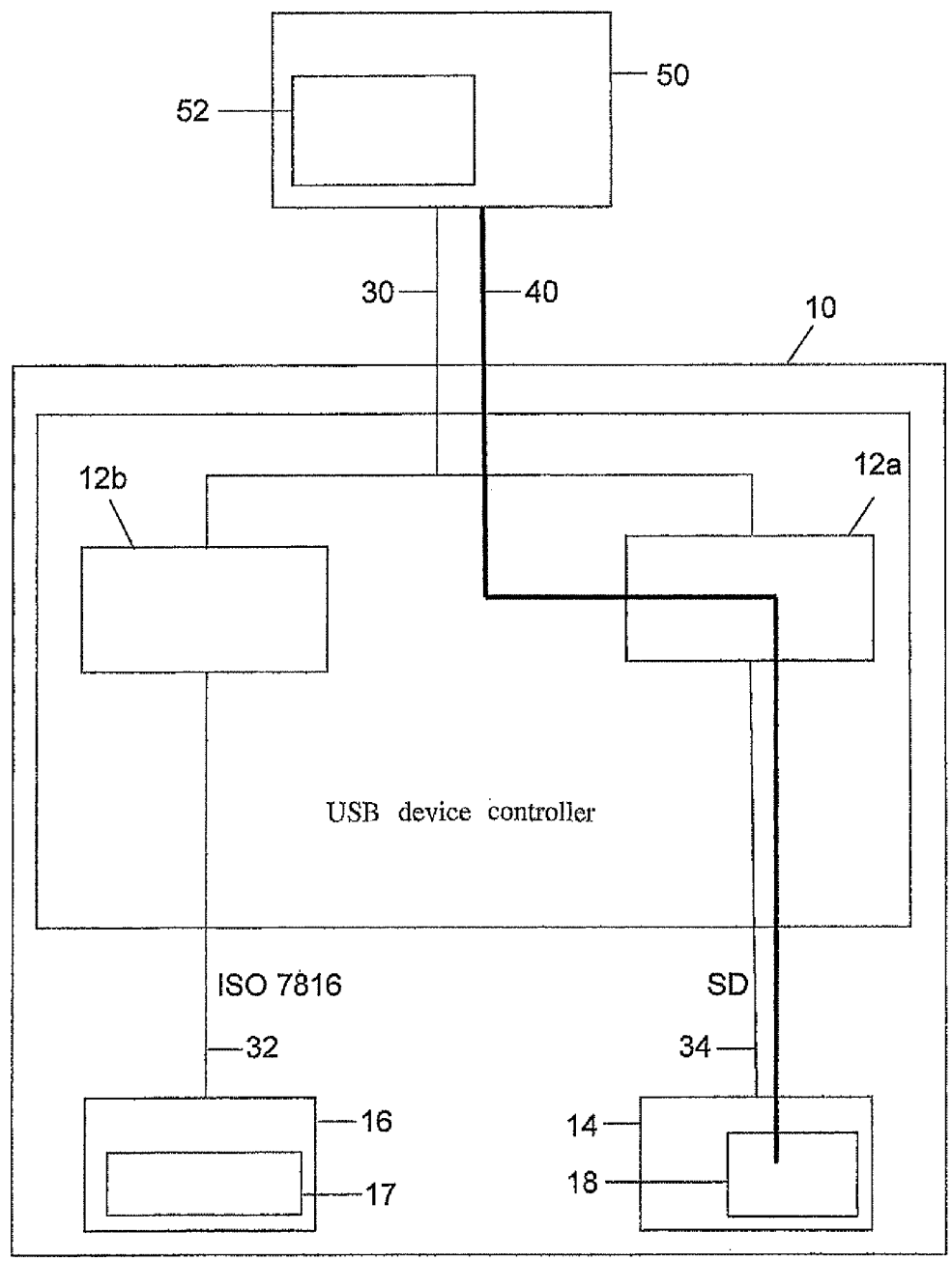

As illustrated in FIG. 4, there can also be provided, instead of two separate controllers 12a, 12b, a single USB device controller 12 in which a terminal controller 12b and a flash controller 12a are realized as functions which can be reached by the terminal 50 via different USB endpoints. The endpoint respectively connected to the terminal 50 is defined within the framework of the USB protocol executed via the communication link 30. A USB hub 20 is not required. The flash controller 12a realized as a function works like the stand-alone flash controller 12a according to FIG. 2. It ascertains commands intended for the hidden storage area 18 on the basis of the routing information and relays them directly thereto. Via further USB endpoints further functions can moreover be realized in the USB device controller 12. The foundations for the technical execution of such a design are found e.g. in the book "USB Complete, Fourth Edition", Jan Axelson, 1999-2009, Lakeview Research LLC, ISBN13 978-1-931448-08-6.

The method of the invention furthermore permits commands that cannot be transferred thereto in a transmission protocol of the storage element to be transferred to the portable storage data carrier in a data block in the first transmission protocol with the routing information. For this purpose the routing information is supplemented, for indicating the command in the second transmission protocol, by a second, predetermined parameter. This procedure handles the problem that for example the USB Mass Storage protocol permits on principle no Secure Digital (SD) commands. This problem is avoided by the routing information being supplemented by a second parameter to thereby tunnel the SD command within the USB protocol. An SD command is thus encapsulated in a data block comprising routing information, which can then be transferred to the storage data carrier according to the USB Mass Storage protocol. On the basis of the second parameter of the routing information a distinction can be made between SD commands and normal commands, such as e.g. a command for the additional module 16. An advantage of this procedure is that there is no need for additional hardware, drivers or administrative rights in the terminal.

A concrete application of this variant is that the storage element 14 constitutes an element physically different from the storage data carrier 10. The storage data carrier 10 here can form a converter between the storage element 14 and the terminal. While the storage data carrier 10 can be addressed e.g. according to the USB Mass Storage protocol, a direct use e.g. of the transmission protocol of the SD storage element is not possible. In this case the described tunneling of SD commands is employed.

The invention claimed is:

1. A method for accessing a portable storage data carrier having a controller for managing a standardized storage element which is accessible to a terminal, and having an additional module, wherein the standardized storage element and the additional module are connected to the controller via different communication links, the method comprising the steps:
    transferring in a first transmission protocol a data block to the storage data carrier, wherein the data block comprises routing information and application data, wherein the routing information contains an identifier which is detectable by the controller,
    determining whether a data block received on the storage data carrier contains routing information, wherein the controller relays application data to the additional module, when it has detected the routing information containing the identifier in the data block, and to the standardized storage element, when it has not detected the routing information,
    forming in the standardized storage element a storage area which is hidden to a terminal and about which the controller transfers no information to the terminal, and
    relaying the data block from the controller directly to the hidden storage area without delay when the data block comprises routing information and the routing information comprises, besides the identifier contained therein, at least one further, predetermined parameter indicating an access to the hidden storage area,
    wherein there is executed on the terminal a privileged application which alone can access the hidden storage area, and
    wherein the routing information is supplemented, for indicating a command in a second transmission protocol, by a second, predetermined parameter.

2. The method according to claim 1, including effecting an access of the privileged application to the hidden storage area without administrative rights for the portable storage data carrier.

3. The method according to claim 1, wherein the storage element of the portable storage data carrier has an actual total size, comprising transferring as the total size from the portable storage data carrier to the terminal a value representing the size of the storage element that results from the difference between the actual total size and the size of the hidden storage area.

4. The method according to claim 1, wherein the terminal is provided with a programming interface which, upon a request of the privileged application to the hidden storage area, converts the request to a data block and adds the further, predetermined parameter to the routing information.

5. The method according to claim 1, including transferring, upon an access to the hidden storage area to the terminal, a file directory of the hidden storage area.

6. The method according to claim 1, including storing the data stored in the hidden storage area in encrypted form.

7. The method according to claim 1, including coordinating the first transmission protocol with the storage element.

8. The method according to claim 1, wherein commands that cannot be transferred to the storage element in a second transmission protocol of the storage element are transferred to the portable storage data carrier in a data block in the first transmission protocol with the routing information.

9. A portable storage data carrier comprising:
    a controller managing a standardized storage element which is accessible to a terminal, and having an additional module, wherein the standardized storage element and the additional module are connected to the controller via different communication links, said data carrier being configured:
    to receive a data block from a terminal in a first transmission protocol, wherein the data block comprises routing information and application data, and wherein the routing information contains an identifier which is detectable by the controller, and
    to determine whether a data block received on the storage data carrier contains routing information, wherein the controller relays application data to the additional module, when it has detected the routing information containing the identifier in the data block, and
    to the standardized storage element, when it has not detected the routing information, wherein in the standardized storage element there is formed a storage area which is hidden to a terminal and about which the controller transfers no information to the terminal, and
    wherein the storage data carrier is further configured to relay the data block from the controller directly to the hidden storage area without delay when the data block comprises routing information and the routing information comprises, besides the identifier contained therein, at least one further, predetermined parameter indicating an access to the hidden storage area, and
    wherein the routing information is supplemented, for indicating a command in a second transmission protocol, by a second, predetermined parameter.

10. A terminal which is configured for access via a standard interface to a portable storage data carrier as recited in claim 9, wherein the terminal is arranged to generate, for application data intended for the additional module, routing information having a further parameter indicating predetermined access to the hidden storage area.

11. A system comprising a portable storage data carrier as recited in claim 9 and a terminal, the terminal being configured to access via a standard interface to the portable storage data carrier, wherein the terminal is arranged to generate, for application data intended for the additional module, routing information having a further parameter indicating predetermined access to the hidden storage area.

12. A non-transitory computer-readable medium storing a computer program product for access to a storage data carrier having an additional module, which is loadable directly into a storage system of a terminal, said computer program product comprising software code portions with which the method steps recited in claim 1 are executed when the computer program product is executed on a processor of the terminal.

13. The method according to claim 1, wherein
the standardized storage element is connected to the controller via a first communication link and the additional module is connected to the controller via a second communication link,
the controller is configured to relay application data to the additional module via the second communication link when it has detected the routing information containing the identifier in the data block and to the standardized storage element via the first communication link when it has not detected the routing information, and
the data block is relayed directly to the hidden storage area via the first communication link.

14. The method according to claim 1, wherein
a data block that otherwise would be relayed to the additional module due to the determination that the data block includes routing information that includes the identifier is relayed instead directly to the hidden storage area due to the determination that the routing information further includes a predetermined parameter.

15. The method according to claim 1, wherein
relaying the data block from the controller directly to the hidden storage area includes writing at least a portion of the data block in the hidden storage area.

16. The method according to claim 9, wherein
the standardized storage element is connected to the controller via a first communication link and the additional module is connected to the controller via a second communication link,
the controller is configured to relay application data to the additional module via the second communication link when it has detected the routing information containing the identifier in the data block and to the standardized storage element via the first communication link when it has not detected the routing information, and
the data block is relayed directly to the hidden storage area via the first communication link.

17. The method according to claim 9, wherein
the storage data carrier is configured a data block that otherwise would be relayed to the additional module due to the determination that the data block includes routing information that includes the identifier is relayed instead directly to the hidden storage area due to the determination that the routing information further includes a predetermined parameter.

18. The method according to claim 9, wherein
at least a portion of the data block is written in the hidden storage area upon relaying the data block from the controller directly to the hidden storage area.

19. A method for accessing a portable storage data carrier, the method comprising:
transferring in a first transmission protocol a data block from a terminal to the storage data carrier;
determining whether the data block received by the storage data carrier includes routing information, an identifier included in the routing information, and a predetermined parameter indicating access to a hidden storage area of the storage data carrier;
relaying the data block from a controller of the storage data carrier to an additional module of the storage data carrier via a first communication link when the controller determines the data block received by the storage data carrier includes routing information including the identifier but does not include a predetermined parameter;
relaying the data block from the controller to a storage element of the storage data carrier via a second communication link when the controller determines the data block received by the storage data carrier contains no routing information; and
relaying the data block from the controller to the hidden storage area via the second communication link when the controller determines the data block received by the storage data carrier includes routing information including the identifier and further includes the predetermined parameter,
wherein the hidden storage area is accessible by the terminal only upon execution on the terminal of a privileged application, the hidden storage area being hidden to the terminal and the controller transferring no information to the terminal without execution on the terminal of the privileged application, and
wherein the routing information is supplemented, for indicating a command in a second transmission protocol, by a second, predetermined parameter.

20. The method according to claim 19, wherein relaying the data block from the controller to the hidden storage area includes forming the hidden storage area in the storage element of the storage data carrier.

21. The method according to claim 20, wherein, in the step of relaying the data block from the controller to the hidden storage area, a portion of data of the data block is temporarily permitted to be written in a portion of the standardized storage element that is write protected.

22. The method according to claim 19, wherein, in relaying the data block from the controller to the hidden storage area, the data block is relayed directly to the hidden storage area without delay.

23. The method according to claim 19, wherein, in relaying the data block from the controller to the hidden storage area, a data block that otherwise would be relayed to the additional module due to the determination that the data block includes routing information that includes the identifier is relayed instead to the hidden storage area due to the determination that the routing information further includes a predetermined parameter.

24. The method according to claim 19, further comprising writing a portion of the data block into the hidden storage area in the case that the controller determines the data block received by the storage data carrier includes routing information including the identifier and further includes the predetermined parameter.

\* \* \* \* \*